United States Patent
Slivka et al.

(10) Patent No.: US 12,092,168 B1
(45) Date of Patent: Sep. 17, 2024

(54) DISCONNECT CLUTCH PISTON COOLING FLOW PORT

(71) Applicant: Schaeffler Technologies AG & Co. KG, Herzogenaurach (DE)

(72) Inventors: Ryan Slivka, Massillon, OH (US); John Volcansek, Medina, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/139,408

(22) Filed: Apr. 26, 2023

(51) Int. Cl.
| F16D 13/52 | (2006.01) |
| F16D 13/72 | (2006.01) |
| F16D 25/0638 | (2006.01) |
| F16D 25/12 | (2006.01) |

(52) U.S. Cl.
CPC ........... F16D 25/123 (2013.01); F16D 13/52 (2013.01); F16D 13/72 (2013.01); F16D 25/0638 (2013.01); F16D 2300/08 (2013.01)

(58) Field of Classification Search
CPC .............................. F16D 13/52; F16D 25/0638
See application file for complete search history.

(56) References Cited

U.S. PATENT DOCUMENTS

| | | | | |
|---|---|---|---|---|
| 5,281,190 A * | 1/1994 | Koivunen | ............. | F16D 43/286 |
| | | | | 192/48.618 |
| 5,416,966 A * | 5/1995 | Boerger, Jr. | ........ | F16H 63/3026 |
| | | | | 29/446 |
| 5,421,439 A * | 6/1995 | Hayasaki | ................ | F16D 48/02 |
| | | | | 192/85.25 |
| 5,558,195 A * | 9/1996 | Bucciero | ................ | F16F 1/043 |
| | | | | 192/85.42 |
| 7,296,507 B2 * | 11/2007 | Onishi | .................... | F16D 25/10 |
| | | | | 92/255 |
| 7,931,135 B2 * | 4/2011 | Dougan | ................. | F16D 48/04 |
| | | | | 192/85.25 |
| 11,111,970 B1 | 9/2021 | Wurst et al. | | |
| 11,698,113 B1 * | 7/2023 | Allen | ................. | F16D 25/0638 |
| | | | | 192/85.54 |
| 2003/0168306 A1 * | 9/2003 | Gorman | .................. | F16D 25/14 |
| | | | | 192/85.25 |
| 2014/0102227 A1 * | 4/2014 | Mayer | .................... | B60K 17/28 |
| | | | | 74/11 |
| 2016/0109010 A1 * | 4/2016 | Lindemann | ............. | B23P 15/00 |
| | | | | 192/3.21 |
| 2020/0248758 A1 * | 8/2020 | Satyaseelan | ............ | F16D 25/10 |
| 2021/0010578 A1 | 1/2021 | de Lima Zocca et al. | | |

* cited by examiner

Primary Examiner — Ernesto A Suarez
Assistant Examiner — Lillian T Nguyen

(57) ABSTRACT

A clutch assembly includes a shaft, a balance dam sealed to the shaft, a seal plate axially spaced from the balance dam and sealed to the shaft, and a piston. The piston is sealed to the shaft and disposed axially between the balance dam and the seal plate. The piston includes an orifice extending axially therethrough. A pressure chamber is bounded in part by the piston and the seal plate. A balance chamber is bounded in part by the piston and the balance dam. The pressure chamber is in fluid communication with the balance chamber via the orifice.

18 Claims, 2 Drawing Sheets

DISCONNECT CLUTCH PISTON COOLING FLOW PORT

TECHNICAL FIELD

The present disclosure relates generally to a disconnect clutch piston, and more specifically to a disconnect clutch piston with a cooling flow port.

BACKGROUND

Disconnect clutches are generally known. In some arrangements, a disconnect clutch assembly may include a shaft defining a portion of a pressure chamber and a portion of a balance chamber. In such arrangements, the shaft may include a first axial channel configured to provide oil flow to the pressure chamber and a second axial channel configured to apply oil cooling flow to the balance chamber. Further, the first and second axial channels may be sealed from each other. It is desirable to have alternative designs and configurations to reduce complexity of the disconnect clutch assembly while still meeting durability and performance requirements.

SUMMARY

Embodiments disclosed herein provide a clutch assembly including a shaft and a balance dam sealed to the shaft. The clutch assembly further includes a seal plate axially spaced from the balance dam and sealed to the shaft. The clutch assembly further includes a piston sealed to the shaft and disposed axially between the balance dam and the seal plate. The piston includes an orifice extending axially therethrough. A pressure chamber is bounded in part by the piston and the seal plate, and a balance chamber is bounded in part by the piston and the balance dam. The pressure chamber is in fluid communication with the balance chamber via the orifice.

In embodiments, the piston may be sealed to the balance dam and the seal plate. In embodiments, the balance dam may be fixed to the shaft, and the piston may be axially slidable on the shaft. In embodiments, the pressure chamber may be sealed from the balance chamber except for the orifice. In embodiments, the balance dam may include a further orifice extending axially therethrough. The further orifice may be arranged radially inside of the orifice.

In embodiments, the clutch assembly may further include a resilient element disposed axially between the hydraulic piston and the balance dam urging the hydraulic piston away from the balance dam. The orifice may be arranged radially outside of the resilient element. In embodiments, the piston may be sealed to the seal plate via a bonded seal. The orifice may be arranged radially closer to the bonded seal than to the resilient element.

In embodiments, the shaft may include an axial channel in direct fluid communication with the pressure chamber. The axial channel may be in indirect fluid communication with the balance chamber via the pressure chamber. The clutch assembly may further include a flow path configured to provide fluid to the pressure chamber. The flow path may pass through the axial channel and may include a first portion bounded in part by piston and the seal plate. The flow path may be further configured to provide fluid to the balance chamber. The flow path may pass through the orifice and may include a second portion bounded in part by the piston and the balance dam.

In embodiments, the clutch assembly may further include a backing plate fixed to the shaft. The balance dam may be disposed axially between the backing plate and the piston. The clutch assembly may further include a clutch plate carrier fixed to the backing plate and disposed axially between the backing plate and the balance dam. The clutch assembly may further include a plurality of clutch plates supported by the clutch plate carrier. The piston may be axially slidable on the shaft to clamp the plurality of clutch plates against the backing plate to close the clutch assembly. The balance dam may include a further orifice extending axially therethrough, and the clutch plate carrier may include a cooling flow orifice extending radially therethrough. The further orifice may be arranged radially inside of the orifice and the cooling flow orifice. The cooling flow orifice may be arranged to permit a fluid to cool the plurality of clutch plates. The shaft may include an axial channel in direct fluid communication with the pressure chamber. The clutch assembly may further include a flow path configured to provide fluid to the pressure chamber. The flow path may pass through the axial channel and may include a first portion bounded in part by the piston and the seal plate. The flow path may be further configured to provide fluid to the balance chamber. The flow path may pass through the orifice and may include a second portion bounded in part by the piston and the balance dam. The flow path may be further configured to provide fluid to cool the plurality of clutch plates. The flow path may pass through the further orifice and the cooling flow orifice and may include a third portion bounded in part by the balance dam and the backing plate. The axial channel may be in indirect fluid communication with the balance chamber via the pressure chamber.

Embodiments according to the present disclosure provide various advantages including cost reductions by creating a flow path that engages the disconnect clutch assembly and cools the clutch plates, which allows for the elimination of multiple channels within the shaft that are configured to either engage the disconnect clutch assembly or cool the clutch plates.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described.

The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
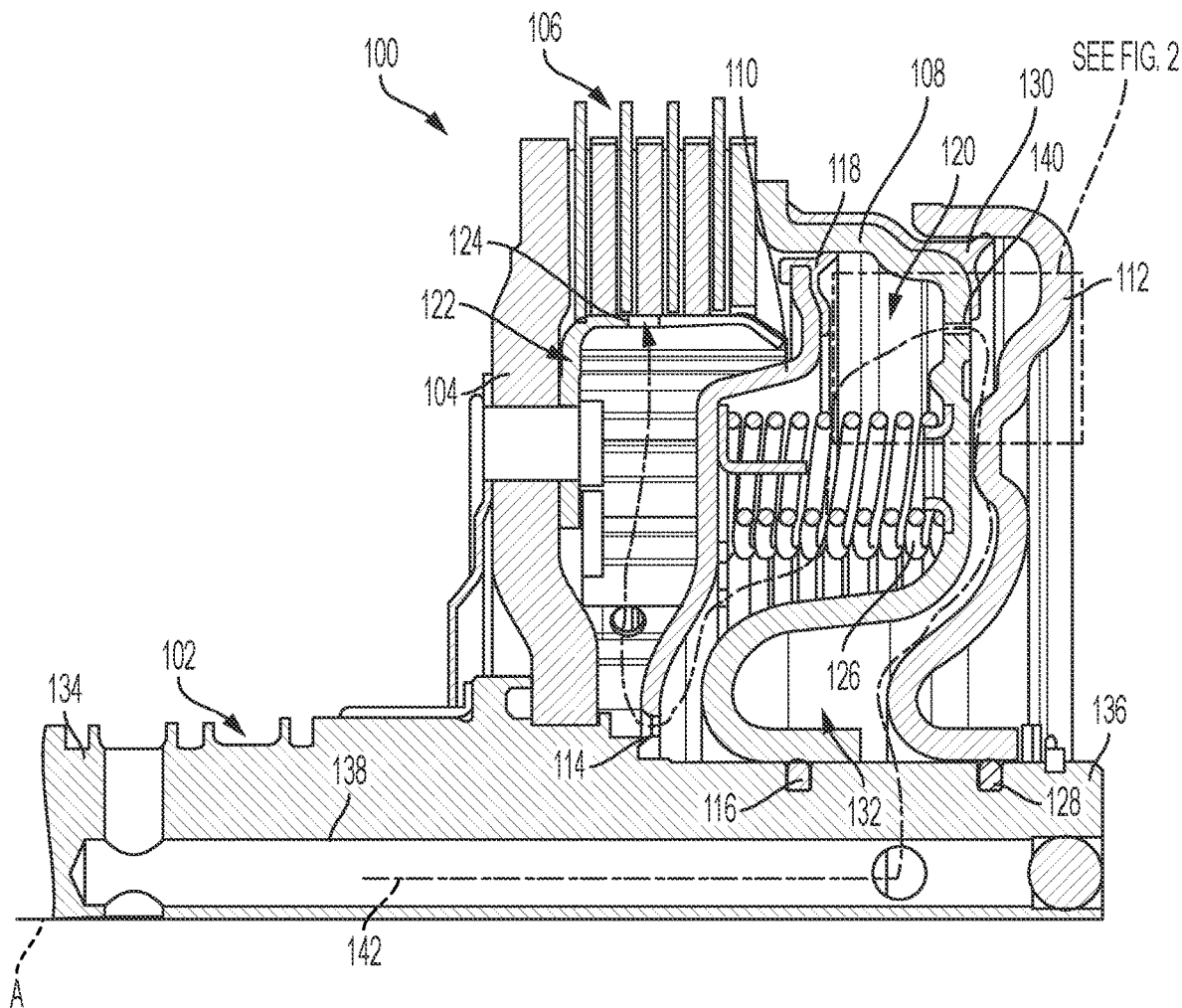
FIG. 1 illustrates a detail cross-sectional view of a disconnect clutch assembly according to an embodiment of the present disclosure.
Figure 2:
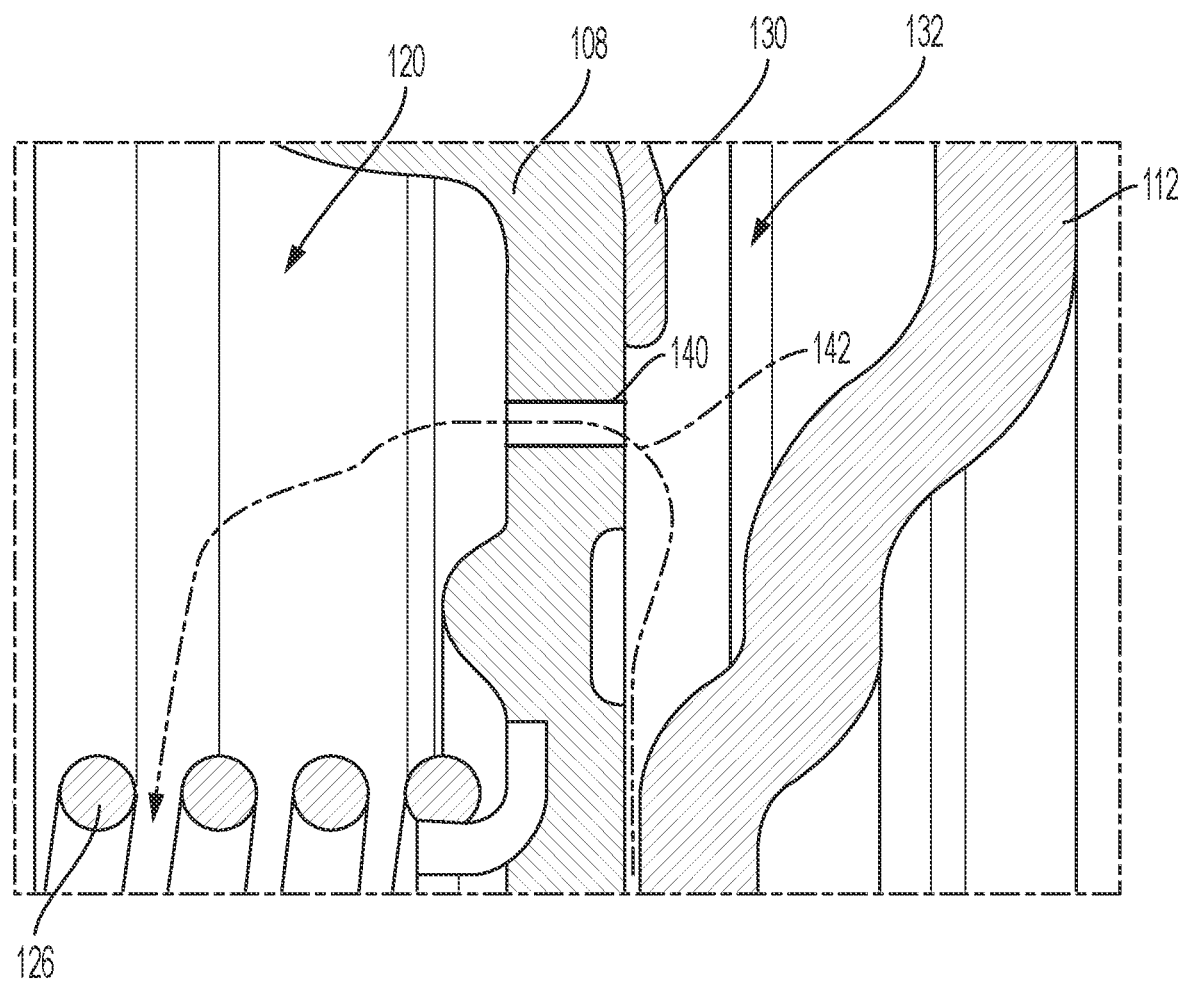
FIG. 2 illustrates cross-sectional view of an enlarged area of the disconnect clutch assembly shown in FIG. 1.

Referring to FIG. 1-2, a disconnect clutch assembly 100 is illustrated according to one exemplary embodiment of the present disclosure. The disconnect clutch assembly 100 is rotatable about a central axis A. Words such as "axial," "radial," "circumferential," "outward," etc. as used herein are intended to be with respect to the central axis A.

The disconnect clutch assembly 100 includes: a shaft 102, a backing plate 104, clutch plates 106, a piston 108, a balance dam 110, and a seal plate 112. The backing plate 104 is fixed to the shaft 102, e.g., by staking. The balance dam 110 is fixed to the shaft 102, e.g., by staking, and is disposed axially between the backing plate 104 and the piston 108. The balance dam 110 is sealed to the shaft 102, e.g., at the staking. The balance dam 110 includes a first orifice 114 for permitting cooling flow through the balance dam 110 to cool the clutch plates 106. The first orifice 114 may be arranged radially closer to the shaft 102 than to an outer diameter of the balance dam 110. The first orifice 114 may include a countersink on at least one side of the balance dam 110.

The piston 108 is sealed to the shaft 102, e.g., by a seal 116, and is axially slidable on the shaft 102 to clamp the clutch plates 106 against the backing plate 104 to close the disconnect clutch assembly 100. The piston 108 and the balance dam 110 are sealed together at a bonded seal 118. The disconnect clutch assembly 100 includes a balance chamber 120 bounded in part by the piston 108 and the balance dam 110. The balance chamber 120 is further defined by, or bounded between, the shaft 102, the balance dam 110, the bonded seal 118, the piston 108, and the seal 116. By "bounded in part," we mean that a portion of the cited chamber, flow path, or other structure is bounded, or formed, by the cited element.

The disconnect clutch assembly 100 also includes a clutch plate carrier 122 disposed axially between the backing plate 104 and the balance dam 110 and fixed to the backing plate 104, e.g., by a riveted connection. The clutch plate carrier 122 includes cooling flow orifice 124 for allowing a radially flowing cooling oil flow, as described further below, to cool the plurality of clutch plates 106.

The disconnect clutch assembly 100 also includes a resilient element 126 disposed axially between the piston 108 and the balance dam 110 urging the piston 108 away from the balance dam 110. In the example embodiment shown, the resilient element 126 includes coil springs disposed about a circumference arranged radially inside of the clutch plates 106. Although coil springs are shown, other resilient elements are possible. For example, resilient element 126 may include a Belleville washer or a rubber puck.

The seal plate 112 is sealed to the shaft 102 at a seal 128. The seal plate 112 is sealed to the piston 108 at a bonded seal 130. The disconnect clutch assembly 100 includes a pressure chamber 132 bounded in part by the seal plate 112 and the piston 108. The pressure chamber 132 is further defined by, or bounded between, the shaft 102, the seal 116, the piston 108, the bonded seal 130, the seal plate 112, and the seal 128. Hydraulic pressure in the pressure chamber 132 is increased to move the piston 108 towards clutch plates 106, pressing the clutch plates 106 against backing plate 104 to engage (or close) the disconnect clutch assembly 100.

The shaft 102 includes a first end 134 arranged adjacent to an engine (not shown) and a second end 136 arranged adjacent to a transmission (not shown). The shaft 102 may include an axial channel 138 in fluid communication with the pressure chamber 132 that adjusts a pressure in the pressure chamber 132. For example, the shaft 102 may include a radial channel (not shown) extending radially through an outer diameter of the axial channel 138 and through an outer diameter of the shaft 102. The radial channel may be arranged axially between the piston 108 and the seal plate 112 such that the axial channel 138 is in fluid communication with the pressure chamber 132 via the radial channel. The axial channel 138 may extend axially from the second end 136 towards the first end 134. For example, the axial channel 138 may extend axially through the second end 136. That is, the axial channel 138 may be open at the second end 136. In such an example, the axial channel 138 must be sealed to direct fluid to apply the piston 108, e.g., preventing the fluid from flowing out of the second end 136 of the shaft 102.

The piston 108 includes a second orifice 140 for introducing a fluid into the balance chamber 120. That is, the second orifice 140 extends axially through the piston 108 from the pressure chamber 132 to the balance chamber 120. In other words, the pressure chamber 132 and the balance chamber 120 may be in fluid communication with each other via the second orifice 140. The pressure chamber 132 and the balance chamber 120 may be sealed from each other except for the second orifice 140.

The second orifice 140 may be configured to introduce the fluid into the balance chamber 120 to hydraulically balance the piston 108 and provide the cooling flow for the clutch plates 106. By hydraulically balancing the piston 108, we mean that balance chamber 120 and a pressure chamber 132 disposed on opposite sides of piston 108 are both filled with fluid, e.g., oil, so that any dynamic pressure effects from rotation of the piston 108, the balance dam 110, the shaft 102, etc. are then compensated, improving controllability of the piston 108 during clutch engagement events.

The second orifice 140 is arranged radially between the seal 116 and the bonded seal 118. The second orifice 140 is disposed radially outside of the resilient element 126. Specifically, the second orifice 140 is disposed closer to the bonded seal 118 than to the resilient element 126. The second orifice 140 may, for example, have a diameter of 1 millimeter (mm). The second orifice 140 may include a countersink on at least one side of the piston 108.

The disconnect clutch assembly 100 includes a flow path 142. The flow path 142 passes through the axial channel 138 into the pressure chamber 132, e.g., via the radial channel. The flow path 142 is bounded in part by the piston 108 and the seal plate 112. Pressurized fluid may be supplied from the shaft 102 to the flow path 142 extending into the pressure chamber 132. That is, the axial channel 138 is in direct fluid communication with the pressure chamber 132. The piston 108 engages or closes the disconnect clutch assembly 100 in response to the pressurization of a medium (e.g., fluid such as oil) in the pressure chamber 132, e.g., by axially displacing the piston 108 relative to the clutch plates 106.

Further, the flow path 142 includes, that is, passes through the second orifice 140 into the balance chamber 120. The flow path 142 is bounded in part by the piston 108 and the balance dam 110. The pressurized fluid may be supplied from the pressure chamber 132 to the balance chamber 120 by passing through the second orifice 140, e.g., to hydraulically balance the piston 108. That is, the axial channel 138 is in indirect fluid communication with the balance chamber 120 via the pressure chamber 132.

Further, the flow path 142 passes through the first orifice 114 out of the balance chamber 120. The flow path 142 is further bounded in part by the balance dam 110 and the backing plate 104. The flow path 142 passes through the cooling flow orifice 124 and is routed between the clutch plates 106, e.g., to cool the clutch plates 106. That is, the pressurized fluid may be supplied from the balance chamber 120 to cool the clutch plates 106 by passing through the first orifice 114 and then through the cooling flow orifice 124. The fluid is returned to the shaft 102 by passing between the clutch plates 106.

The pressure chamber 132 is in fluid communication with the balance chambers 120 and with the clutch plates 106 via the flow path 142. That is, the flow path 142 provides fluid to engage the disconnect clutch assembly 100, fill the balance chamber 120, and cool the clutch plates 106. Providing fluid communication between the pressure chamber 132, the balance chamber 120, and the clutch plates 106 can reduce the complexity of the disconnect clutch assembly 100 by removing the need for two channels arranged in the shaft 102 that are configured to either provide fluid to engage the disconnect clutch assembly 100 or to provide fluid to fill the balance chamber 120 and cool the clutch plates 106.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 disconnect clutch assembly
102 shaft
104 backing plate
106 clutch plates
108 piston
110 balance dam
112 seal plate
114 orifice
116 seal
118 bonded seal
120 balance chamber
122 clutch plate carrier
124 cooling flow orifice
126 resilient element
128 seal
130 bonded seal
132 pressure chamber
134 end
136 end
138 axial channel
140 orifice
142 flow path
A central axis

What is claimed is:

1. A clutch assembly, comprising:
   a shaft;
   a balance dam sealed to the shaft;
   a seal plate axially spaced from the balance dam and sealed to the shaft; and
   a piston sealed to the shaft and disposed axially between the balance dam and the seal plate, the piston including an orifice extending axially therethrough;
   wherein a pressure chamber is bounded in part by the piston and the seal plate, and a balance chamber is bounded in part by the piston and the balance dam;
   wherein the pressure chamber is in fluid communication with the balance chamber via the orifice;
   wherein the shaft includes only one axial channel, the axial channel being in direct fluid communication with the pressure chamber;
   wherein the balance chamber is only in indirect fluid communication with the axial channel.

2. The clutch assembly of claim 1, wherein the piston is sealed to the balance dam and the seal plate.

3. The clutch assembly of claim 1, wherein the balance dam is fixed to the shaft, and the piston is axially slidable on the shaft.

4. The clutch assembly of claim 1, wherein the pressure chamber is sealed from the balance chamber except for the orifice.

5. The clutch assembly of claim 1, further comprising a resilient element disposed axially between the piston and the balance dam urging the piston away from the balance dam, wherein the orifice is arranged radially outside of the resilient element.

6. The clutch assembly of claim 5, wherein the piston is sealed to the seal plate via a bonded seal, the orifice being arranged radially closer to the bonded seal than to the resilient element.

7. The clutch assembly of claim 1, wherein the balance dam includes a further orifice extending axially therethrough, the further orifice being arranged radially inward relative to the orifice.

8. The clutch assembly of claim 1, further comprising a flow path configured to provide fluid to the pressure chamber, wherein the flow path passes through the axial channel and includes a first portion bounded in part by piston and the seal plate.

9. The clutch assembly of claim 8, wherein the flow path is further configured to provide fluid to the balance chamber, wherein the flow path passes through the orifice and includes a second portion bounded in part by the piston and the balance dam.

10. A clutch assembly, comprising:
a shaft;
a balance dam sealed to the shaft;
a seal plate axially spaced from the balance dam and sealed to the shaft;
a piston sealed to the shaft and disposed axially between the balance dam and the seal plate, the piston including an orifice extending axially therethrough;
a backing plate fixed to the shaft, wherein the balance dam is disposed axially between the backing plate and the piston;
a clutch plate carrier fixed to the backing plate and disposed axially between the backing plate and the balance dam; and
a plurality of clutch plates supported by the clutch plate carrier, wherein the piston is axially slidable on the shaft to clamp the plurality of clutch plates against the backing plate to close the clutch assembly;
wherein a pressure chamber is bounded in part by the piston and the seal plate, and a balance chamber is bounded in part by the piston and the balance dam;
wherein the pressure chamber is in fluid communication with the balance chamber via the orifice;
wherein the shaft includes only one axial channel, the axial channel being in direct fluid communication with the pressure chamber;
wherein the balance chamber is only in indirect fluid communication with the axial channel.

11. The clutch assembly of claim 10, wherein the balance dam includes a further orifice extending axially therethrough, and the clutch plate carrier includes a cooling flow orifice extending radially therethrough.

12. The clutch assembly of claim 11, wherein the further orifice is arranged radially inward relative to orifice and the cooling flow orifice.

13. The clutch assembly of claim 11, wherein the cooling flow orifice is arranged to permit a fluid to cool the plurality of clutch plates.

14. The clutch assembly of claim 11, wherein the shaft includes an axial channel in direct fluid communication with the pressure chamber.

15. The clutch assembly of claim 14, further comprising a flow path configured to provide fluid to the pressure chamber, wherein the flow path passes through the axial channel and includes a first portion bounded in part by the piston and the seal plate.

16. The clutch assembly of claim 15, wherein the flow path is further configured to provide fluid to the balance chamber, wherein the flow path passes through the orifice and includes a second portion bounded in part by the piston and the balance dam.

17. The clutch assembly of claim 16, wherein the flow path is further configured to provide fluid to cool the plurality of clutch plates, wherein the flow path passes through the further orifice and the cooling flow orifice and includes a third portion bounded in part by the balance dam and the backing plate.

18. The clutch assembly of claim 14, wherein the axial channel is in indirect fluid communication with the balance chamber via the pressure chamber.

* * * * *